(No Model.)
E. G. MOORE.
AIR PUMP GOVERNOR.
No. 378,609. Patented Feb. 28, 1888.
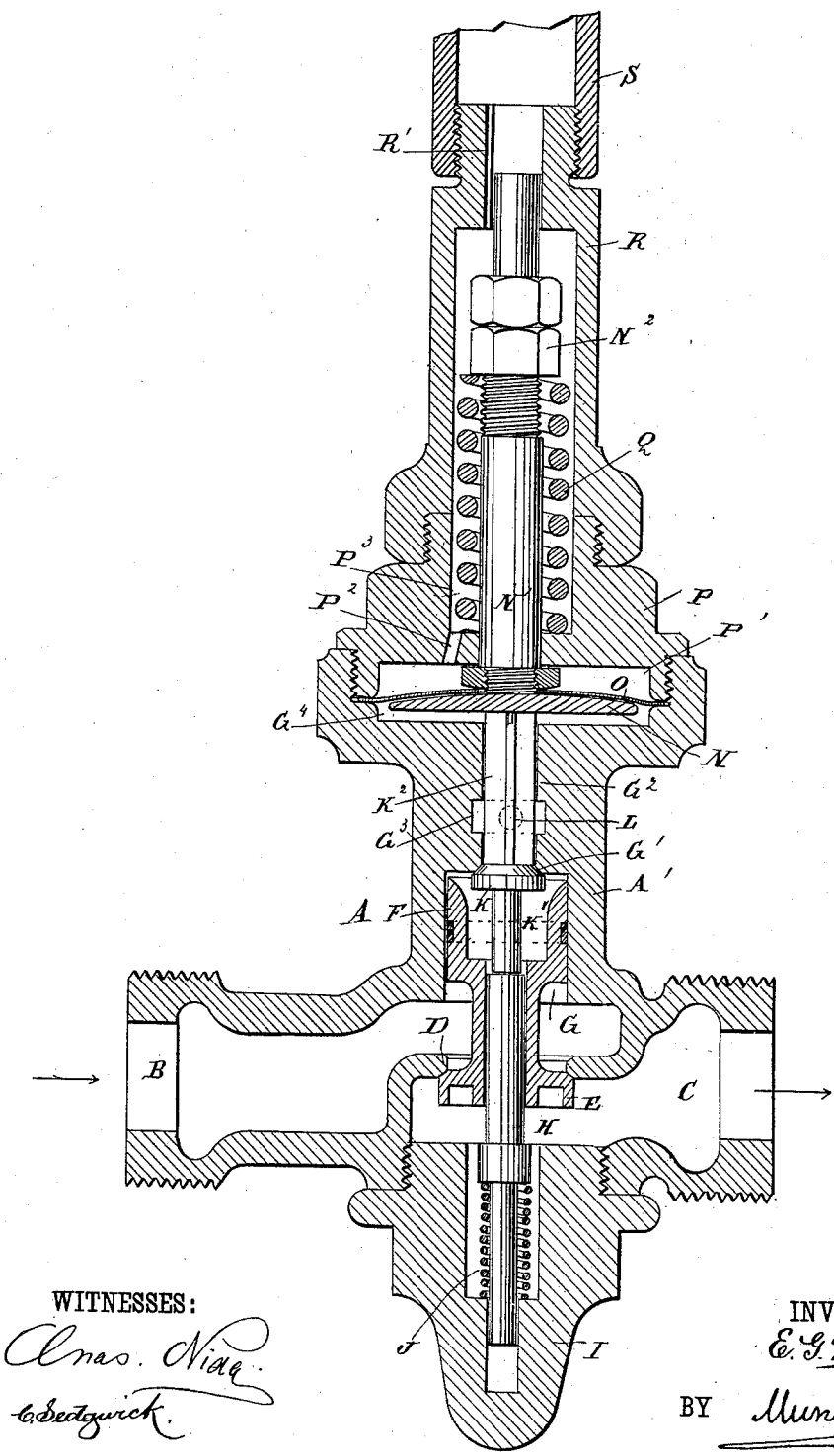
WITNESSES:
INVENTOR:
E. G. Moore.
BY Munn & Co
ATTORNEYS.

UNITED STATES PATENT OFFICE.

EDWARD G. MOORE, OF WILMINGTON, DELAWARE.

AIR-PUMP GOVERNOR.

SPECIFICATION forming part of Letters Patent No. 378,609, dated February 28, 1888.

Application filed July 14, 1887. Serial No. 244,306. (No model.)

*To all whom it may concern:*

Be it known that I, EDWARD G. MOORE, of Wilmington, in the county of New Castle and State of Delaware, have invented a new and Improved Air-Pump Governor, of which the following is a full, clear, and exact description.

The object of my invention is to provide a new and improved governor especially adapted for the air-pumps of locomotives, to prevent an excess of air-pressure in the train-pipes, and to cause an accumulation of air in the air-reservoir while the brakes are applied, thus permitting an instantaneous release of the brakes when desired.

The invention consists in the construction and arrangement of certain parts and details and combinations of the same, as will be fully described hereinafter, and then pointed out in the claims.

Reference is to be had to the accompanying drawing, forming a part of this specification, in which the figure represents a sectional side elevation of my improvement.

The governor-casing A is provided with the steam-inlet B, connected by the valve-seat D with the steam-outlet C, leading to the pump. On the under side of the valve-seat D is held the valve E, provided with an upwardly-extending hub carrying the piston F, held to slide in the aperture G, formed freely and not steam-tight in the extension A' of the governor-casing A, so that steam may leak into the space above the piston, for the purpose to be presently described.

The valve E and its hub are held to slide centrally on the spindle H, having its bearing at its lower end in the nut I, screwing on or otherwise secured to the governor-casing A. On the spindle H is coiled a spring, J, one end of which rests against the shoulder formed on said spindle H, and its other end rests on a shoulder formed in the nut I. On the upper end of the spindle H rests the stem K', supporting the valve K, held on the valve-seat G', formed in the aperture $G^2$, leading from the aperture G to a space, $G^4$, formed in the upper end of the part A' of the governor-casing A.

The valve K is provided with upwardly-extending wings $K^2$, held in said aperture $G^2$, and on the top of said wings $K^2$ rests the disk N, supporting the diaphragm O, held in the aperture or recess $G^4$ of the part A', and in a recess, P', of the nut P, screwing into the upper end of the part A'. The diaphragm O is held in place on the disk N by a nut screwing on the lower end of the stem N', which supports said disk N, and which also passes centrally through the diaphragm O. The recess P' in the nut P is connected by the aperture $P^2$ with the central opening, $P^3$, into which said stem N' projects. On the latter, in said recess $P^3$, is coiled a spring, Q, one end of which rests on the bottom of said opening $P^3$, its other end resting against the nut $N^2$, screwing on the stem N' near its upper end. The extreme upper end of the stem N' is guided in a central aperture formed in the cap R, screwing on the nut P, and connected at its outer end by a pipe, S, with the engineer's three-way cock or train-pipe. The opening $P^3$ and the central opening of the cap R are connected with said pipe S by a slot, R', formed in the upper central aperture, in which the upper end of the stem N' is guided.

In the aperture $G^2$ is formed an annular recess, $G^3$, which surrounds the wings or flanges $G^2$ of the valve K, and connects with the waste-pipe opening L, which is shown in dotted lines in the drawing.

The operation is as follows: The steam entering the inlet B will gradually leak around the piston F into the space at the upper side of the piston until the same is filled, when the valve will be forced from its seat, as no pressure is exerted against the lower side thereof. The steam now passes freely by the valve and out through the outlet C to the pump, which continues to run until the required amount of air is accumulated. As soon as this is accomplished the compressed air will operate the valve K and relieve the upper end of the valve E from pressure, as will presently appear. The spring Q, which holds the diaphragm O in its upper position, is set to a normal tension of, say, about seventy pounds, and when the pressure of the compressed air exceeds this normal pressure of the spring Q then the diaphragm O is forced downward, and by its disk N imparts a sliding motion to the valve K, which is thus unseated from its seat G', thereby allowing the steam on the upper side of the valve E to escape through the opening L of the waste-pipe, so that an excess of pressure on the lower valve, E, is caused, thereby forcing the valve E against its seat D, thus cutting off the steam-supply from the pump. When the pressure in the train-pipes is diminished by applying the brake, the diaphragm is restored to its former position by the action of the spring Q and the valve K, and is again seated by the action of the spindle H, which is forced upward by the spring J, which had been compressed on the downward motion of the diaphragm O, as above described. The steam now accumulating on the upper side of the valve E, as before described, again forces said valve down, and thereby opens a passage for the steam through the inlet B to the outlet C and to the pump, as before described, until the air-pressure is again restored to the required limit, say seventy pounds.

It will be seen that by my improvement I prevent the carrying of an excessive air-pressure, which prevents sliding of the car-wheels, and which also causes the accumulation of a surplus of air in the main reservoir while the brakes are applied, so as to enable the engineer to release the brakes without delay. It will further be seen that the speed of the pump is limited and the wear of the same is reduced.

Having thus described my invention, what I claim as new, and desire to secure by Letters Patent, is—

1. In an air-pump governor, the combination, with the diaphragm held under spring-pressure and acted upon by compressed air, of a valve opened by said diaphragm, a second valve seated and unseated by the steam-pressure and having a longitudinal bore through it, and a spindle extending through said bore and closing the valve opened by the diaphragm, substantially as set forth.

2. In an air-pump governor, the combination, with the diaphragm held under spring-pressure and acted upon by compressed-air pressure, of a valve operated upon by said diaphragm, and a hollow steam-valve, which first-named valve has its stem entering the hollow valve and acting upon a spring-pressed spindle, also entering the said hollow valve, substantially as set forth.

3. In an air-pump governor, the diaphragm O, supported by the spring Q, and exposed on its upper face to the action of the compressed air, in combination with the valve K, connected by its stem $K^2$ with the under side of said diaphragm, and the valve E, receiving a stem, $K'$, of said valve K, having the piston F, and adapted to be unseated and seated by the steam-pressure and through the action of said first-mentioned valve, said stem $K'$ resting upon a spring-pressed spindle entering the said valve E, substantially as shown and described.

EDWARD G. MOORE.

Witnesses:
HENRY A. SAUNDERS,
ANDREW TRAYNOR.